(12) United States Patent
Raghu et al.

(10) Patent No.: US 9,043,938 B1
(45) Date of Patent: May 26, 2015

(54) SECURED WIRELESS ACCESS SYSTEM AND RELATED METHOD

(75) Inventors: Kaushik Raghu, Cedar Rapids, IA (US); Ivan N. Hall, Iowa City, IA (US); Jesse B. Pate, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 278 days.

(21) Appl. No.: 13/601,399

(22) Filed: Aug. 31, 2012

(51) Int. Cl.
*H04L 29/12* (2006.01)
*H04L 9/08* (2006.01)
*H04L 9/32* (2006.01)

(52) U.S. Cl.
CPC ........................... *H04L 9/085* (2013.01)

(58) Field of Classification Search
CPC ............................ G08G 5/004; G08G 5/0034
See application file for complete search history.

(56) References Cited

U.S. PATENT DOCUMENTS

| | | | |
|---|---|---|---|
| 7,707,622 B2* | 4/2010 | Fiske | 726/2 |
| 7,979,716 B2* | 7/2011 | Fiske | 713/184 |
| 8,649,785 B2* | 2/2014 | Durand et al. | 455/431 |
| 2012/0218127 A1* | 8/2012 | Kroen | 340/945 |
| 2012/0320895 A1* | 12/2012 | Srinivasan et al. | 370/338 |

* cited by examiner

*Primary Examiner* — Venkat Perungavoor
(74) *Attorney, Agent, or Firm* — Angel N. Gerdzhikov; Donna P. Suchy; Daniel M. Barbieri (57) ABSTRACT

The disclosure is directed to a system and method for establishing a secured wireless connection allowing the exchange of information between a wireless device and aircraft equipment. The secured wireless access system may require a user controlling the wireless device to interact with an onboard interface to initiate a connection. The user may be further required to enter a randomly generated security passcode to pair the mobile device to the aircraft equipment. Further security measures may be implemented, such as tiered user access levels restricting certain equipment and/or information based upon a user identity of the user requesting access.

17 Claims, 4 Drawing Sheets

SECURED WIRELESS ACCESS SYSTEM AND RELATED METHOD

TECHNICAL FIELD

The present disclosure relates to the field of secured wireless communications, and in particular to a system and method for providing secured wireless access to aircraft information.

BACKGROUND

Some users prefer accessing information through personal mobile devices rather than utilizing onboard information delivery modules, such as permanently or semi-permanently fixed information displays or audio systems, which are commonly found in transit vehicles, such as aircrafts, buses, boats, and the like. Mobile devices may provide comfort, mobility, privacy, and/or hygiene related benefits over onboard information delivery modules. Accordingly, users may desire to access aircraft or other vehicle information wirelessly through mobile devices, such as smartphones, tablets, notebooks, and the like.

However, information security may be heavily compromised through the use of wireless communication protocols, such as Bluetooth, Infrared, Wifi, NFC, cellular and the like. Security concerns are particularly prevalent in the context of aircraft information because the type or amount of information that can be safely accessed may significantly differ between different persons aboard an aircraft, such as a pilot, crew member, or passenger. Therefore, it is desirable to provide wireless access to aircraft information without the foregoing security limitations.

SUMMARY

The present disclosure is directed to a system and method for providing secured wireless access to information from equipment onboard an aircraft or other vehicle to one or more users.

In one aspect, the present disclosure is directed to a system for providing secured wireless access to aircraft information, including: aircraft equipment configured to receive aircraft information; and a wireless access module in communication with the aircraft equipment, the wireless access module configured to: receive a first connection request from a user interface of the aircraft equipment; receive a second connection request from a mobile device; generate a random machine-generated security passcode associated with the first and second connection requests; present the random machine-generated security passcode only to a specific user, wherein the specific user is prompted to enter a user-entered security passcode into the mobile device; receive a user-entered security passcode from the mobile device; compare the random machine-generated security passcode and the user-entered security passcode; establish a wireless connection between the aircraft equipment and the mobile device when the user-entered security passcode matches the random machine-generated security passcode; and allow the mobile device to access aircraft information through the aircraft equipment via the established wireless connection.

In another aspect, the present disclosure is directed to a system for providing secured wireless access to vehicle information, including: vehicle equipment configured to receive vehicle information; and a wireless access module in communication with the vehicle equipment, the wireless access module configured to: receive a first connection request from a user interface of the vehicle equipment; receive a second connection request from a mobile device; generate a random machine-generated security passcode associated with the first and second connection requests; present the random machine-generated security passcode only to a specific user, wherein the specific user is prompted to enter a user-entered security passcode into the mobile device; receive a user-entered security passcode from the mobile device; compare the user-entered security passcode and the random machine-generated security passcode; establish a wireless connection between the vehicle equipment and the mobile device when the user-entered security passcode matches the random machine-generated security passcode; allow the mobile device to access vehicle information through the vehicle equipment via the established wireless connection; receive a user identity, the user identity including name information and level of authority information; and restrict access to certain vehicle information based upon the user identity.

In another aspect, the present disclosure is directed to a method of providing secured wireless access to aircraft information, including the steps of: receiving aircraft information utilizing aircraft equipment; receiving a first connection request from a user interface of the aircraft equipment; receiving a second connection request from a mobile device; generating a random machine-generated security passcode associated with the first and second connection requests; presenting the random machine-generated security passcode only to a specific user; prompting the user to enter a user-entered security passcode into the mobile device; receiving a user-entered security passcode from the mobile device; comparing the user-entered security passcode and the random machine-generated security passcode; establishing a wireless connection between aircraft equipment and the mobile device when the user-entered security passcode matches the random machine-generated security passcode; and allowing the mobile device to access aircraft information through the aircraft equipment via the established wireless connection.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings.

Figure 1A:
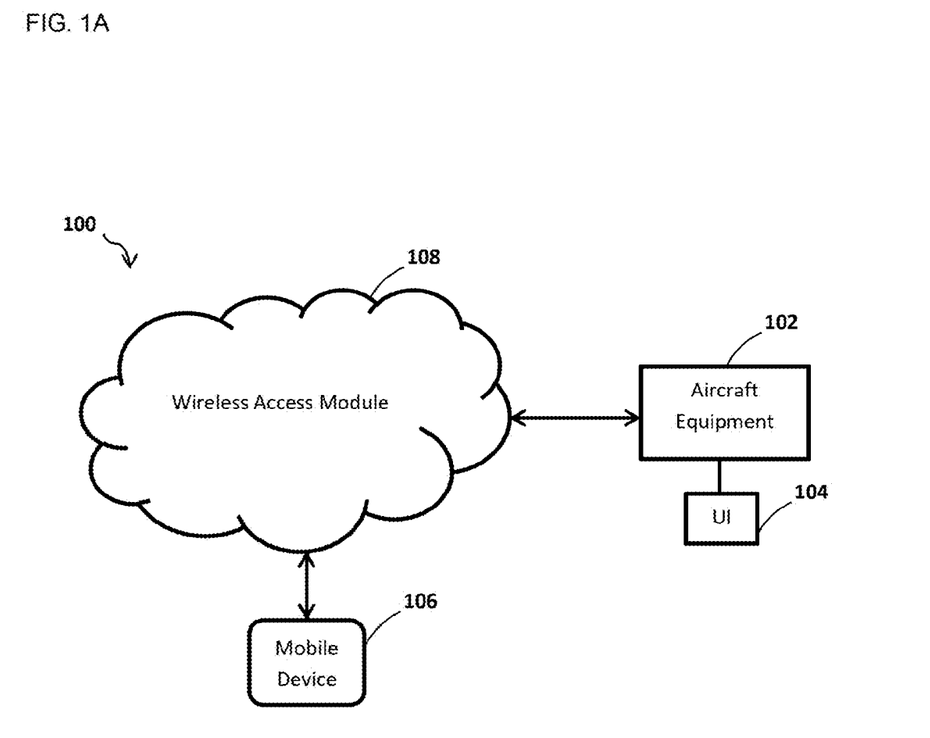
FIG. 1A is a block diagram illustrating a system for providing secured wireless access to aircraft information, in accordance with one embodiment of the present disclosure.
Figure 1B:
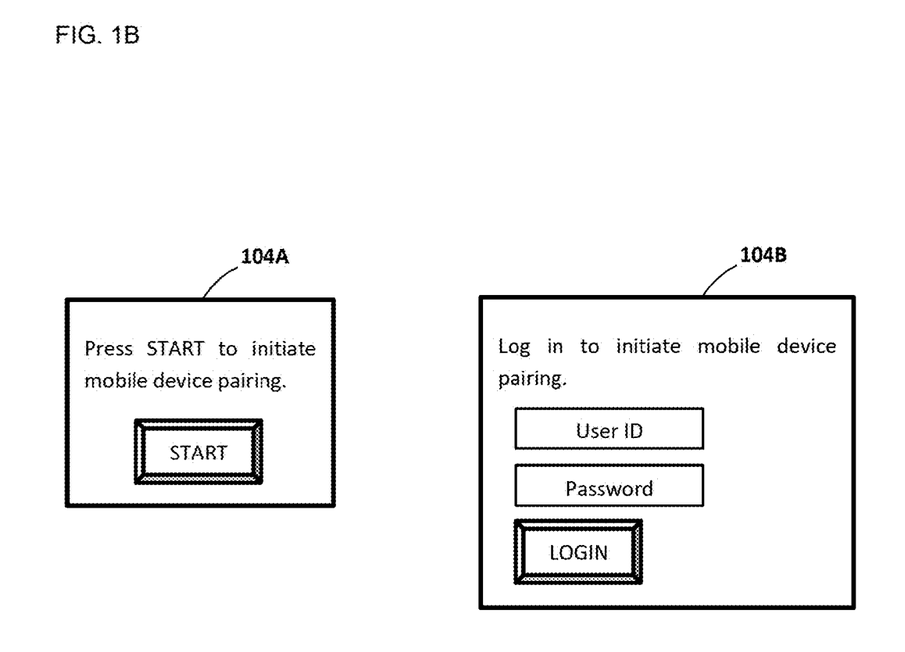
FIG. 1B is a conceptual illustration of aircraft equipment user interfaces configured for receiving one or more user commands to initiate pairing between aircraft equipment and a mobile device, in accordance with one embodiment of the present disclosure.
Figure 1C:
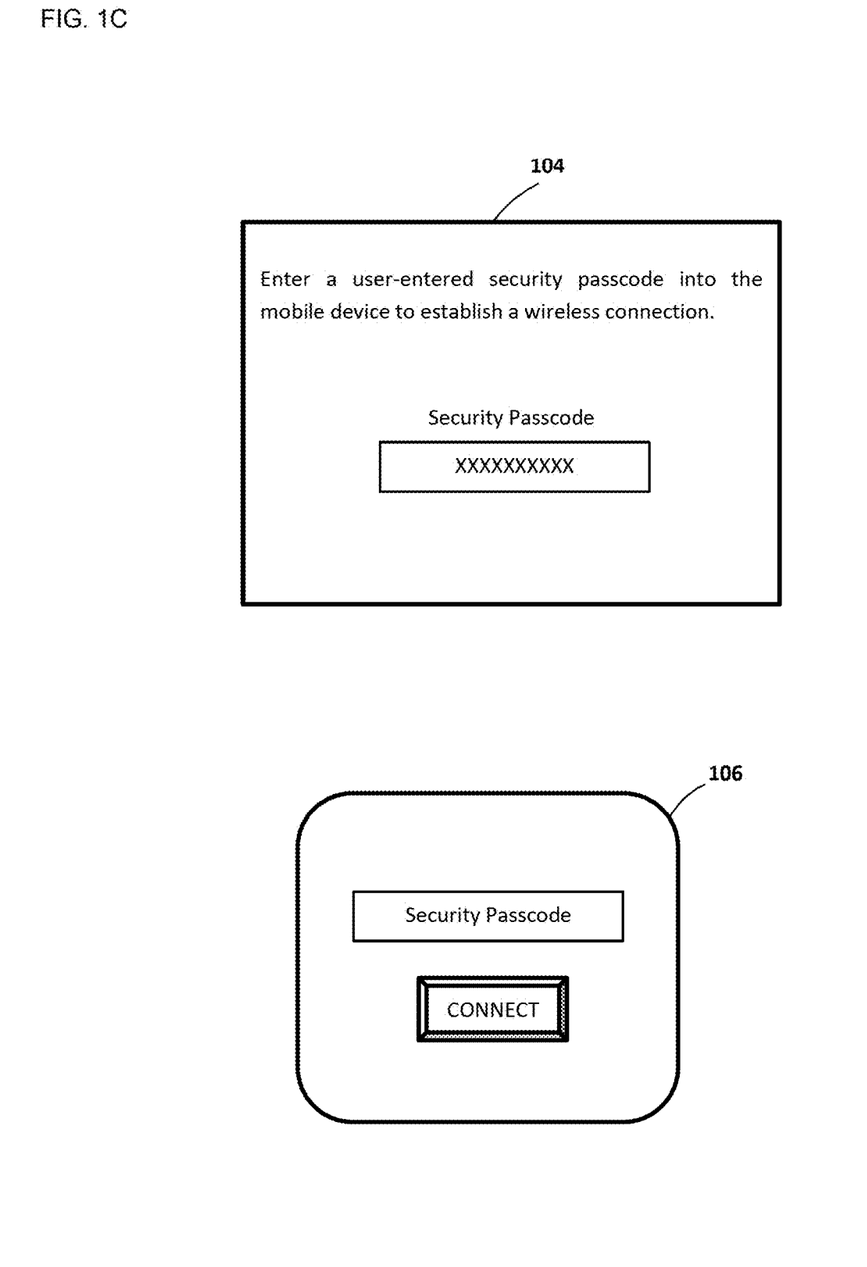
FIG. 1C is a conceptual illustration of an aircraft equipment user interface configured for providing a random machine-generated security passcode and a mobile device configured for accepting a user-entered security passcode, in accordance with one embodiment of the present disclosure.
Figure 2:
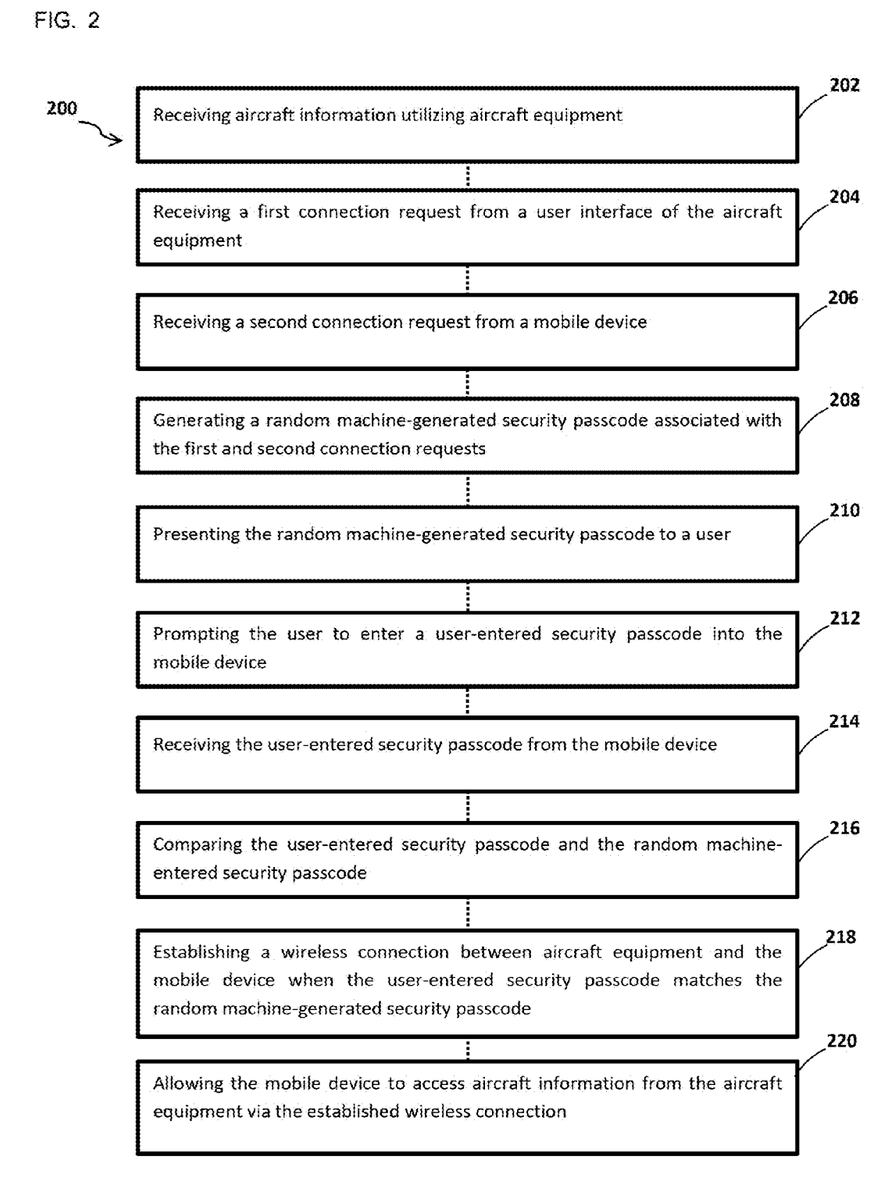
FIG. 2 is a flow diagram illustrating a method of providing secured wireless access to aircraft information, in accordance with one embodiment of the present disclosure.

FIGS. 1A through 2 generally illustrate a system and method for providing a secured wireless connection to allow a wireless device, also known as a mobile device, such as a phone, smartphone, tablet computer, laptop computer and the like to receive information from equipment onboard an aircraft. However, it is noted herein that the following discussion of a system and method for providing secured wireless access to information from equipment onboard an aircraft is intended to encompass secured mobile retrieval of information from wirelessly accessible equipment onboard any vehicle, such as an aircraft, bus, boat, train, car, truck, hovercraft, or any other single or multiple person vehicle. Accordingly, the following description should be construed to encompass any vehicle unless otherwise noted herein.

FIGS. 1A through 1C illustrate a system 100 for providing secured wireless access to aircraft information. The accessed aircraft information may include, but is not limited to, aircraft position, speed, trajectory, flight duration, elapsed time, time to destination, anticipated delay, flight plan, weather radar data, traffic data, sensor data, aircraft performance data, equipment controls, external air temperature, attendant call button activity, cabin status messages, ground crew communications, connecting flight information, inflight entertainment, and the like. For security and/or convenience reasons, it may be desirable to restrict certain users from accessing certain information. Optionally, the system 100 may employ information access levels to restrict certain users or classes of users from accessing certain information.

In one embodiment the system 100 may specify pilot (high), crew member (intermediate), and passenger (low) access levels and may restrict access to aircraft information in accordance with specified access levels. Pilots may need to access equipment controls, traffic data, sensor data, aircraft performance data, ground crew communications, flight plan, navigation information, and/or other pilot information that is not necessary or unsafe for other users to possess. Therefore, the system 100 may be configured to provide a pilot access to all information (i.e. pilot, crew member, and passenger information) or customized access to information that is relevant to carrying out the pilot's duties. Similarly, crew members may need to access cabin status messages, ground crew communications, attendant call button activity, and/or other crew member information that is relevant to crew member duties but unnecessary or unsafe for other users to possess. Accordingly, a crew member may have partially restricted access to aircraft information. For example, the system 100 may be configured to provide crew members access to passenger information and crew member information. However, the system 100 may be configured to restrict crew member access pilot information. The system may be further configured to restrict passenger access to any information except for passenger information, such as aircraft position, speed, elapsed time, time to destination, external air temperature, temperature/weather conditions at destination, connecting flight information, inflight entertainment, and/or any other information that is safe for all individuals aboard an aircraft to possess.

The foregoing embodiment is included by way of example only to illustrate one possible specification of access levels and information accessible at each level. However, it is noted herein that the access levels and information accessible at each level may be specified as desired or as required for any particular application. Any number of access levels may be implemented in the system 100 with any possible combination of restrictions on information accessible at each level. The system 100 may further employ specific access levels for one or more specified users.

In one embodiment, the system 100 may further include customized access levels or customized display options allowing voluntary addition or removal of accessible information as desired. For example, a pilot may wish to hide certain crew member information at times because the crew member information may be unnecessary for the pilot to access. Similarly, the pilot may wish to unhide or regain access to the crew member information. Accordingly, the system 100 may allow the user or a system administrator to customize information access levels or information display options.

The system 100 may include aircraft equipment 102 configured to send and/or receive information. The aircraft equipment 102 may include one or more sensors, such as speed sensors, location/position sensors, temperature sensors, RF receivers/transmitters, and/or any other sensors configured to detect or receive aircraft information. The aircraft equipment 102 may further include one or more information delivery modules, such as a flight management system, flight entertainment system, flight deck avionics, flight deck displays, navigation system displays, crew displays, galley displays, bulkhead displays, passenger seat back displays, passenger personal displays, a PA system, communications management unit (CMU) and/or any other visual or aural information delivery module.

The aircraft equipment 102 may further include at least one user interface 104 configured to receive user interactions. For example, the user interface 104 may include buttons, a touchpad, keypad, mouse, joystick, trackball, touch display, microphone, barcode reader, magnetic card reader, infrared receiver, RF receiver, camera, or any other device capable of directly or indirectly interacting with a user in the proximity of the user interface 104. In one embodiment, the user interface 104 may be configured to receive direct user interactions, such as a user pressing a button, moving a cursor, entering text into a keyboard, speaking into a microphone, and the like. Alternatively or additionally, the user interface 104 may be configured to accept indirect user interactions, such as a user scanning a barcode, presenting an RFID tag, allowing a camera to detect a portion of the user, swiping a magnetized card, or any other indirect user interaction.

The user interface 104 may be further configured to only receive user interactions within certain proximity of the user interface 104 and/or the equipment. Maintaining a certain level of user proximity may provide added security to prevent undesired access to aircraft equipment 102 by distantly located persons. In addition, the user interface 104 may be integrated within the aircraft equipment 102 so that a user wishing to establish secured wireless access may initiate a connection request by interacting directly with the aircraft equipment 102 via the integrated user interface 104. Alternatively, the user interface 104 may be communicatively coupled to the aircraft equipment 102 so that the user may initiate a connection request by interacting indirectly with the aircraft equipment 102 via the communicatively coupled user interface 104 of the aircraft equipment 102.

In one embodiment, the aircraft equipment 102 may include a plurality of user interfaces 104. At least one sensor or information delivery module of aircraft equipment 102 may have a designated user interface 104 configured for accessing the sensor or information delivery module. In another embodiment, one user interface 104 may be configured for accessing multiple sensors or information delivery modules of aircraft equipment 102. In a further embodiment, one or more user interfaces 104 may be configured for accessing multiple sensors or information delivery modules in addition to the user interface 104 designated for each sensor or information delivery module.

The system 100 may further employ specific access levels to restrict access to certain equipment 102. For example, in one embodiment the system 100 may have pilot (high), crew member (medium), and passenger (low) access levels. The system 100 may be configured to provide a pilot access to all equipment 102 including pilot equipment 102, such as flight deck avionics, a flight management system, flight deck displays, navigation displays, pilot radios, and the like. The system 100 may be further configured to provide crew members access to some equipment 102 including crew member equipment 102, such as crew displays, galley displays, crew member radios, and the like. However, the system 100 may be configured to restrict crew members from accessing the pilot equipment 102. The system 100 may be further configured to restrict passenger access to all equipment 102 except for equipment 102 that can be safely accessed by all persons aboard the aircraft, such as bulkhead displays, passenger seat back displays, passenger personal displays, and the like.

The foregoing embodiment is included by way of example only to illustrate one possible system configuration of access levels and the equipment 102 accessible at each level. However, it is noted herein that the access levels and equipment 102 accessible at each level may be specified as desired or as required for any particular application. The system 100 may be configured to employ any number of access levels with any possible combination of restrictions on equipment 102 accessible at each level. The system 100 may further employ specific access levels for one or more specified users.

The system 100 may further include a wireless access module 108 in communication with the aircraft equipment 102. The wireless access module 108 may be configured to establish secured wireless communication between the aircraft equipment 102 (i.e. one or more sensors or information delivery modules) and a mobile device 106. The wireless access module 108 may further allow the mobile device 106 to send and/or receive information to and/or from the aircraft equipment 102. For example, the wireless access module 108 may allow the mobile device 106 to receive aircraft information collected by a sensor or received by an information delivery module utilizing the established wireless connection. The wireless access module 108 may further allow the mobile device 106 to send requests for certain information or to send control signals utilizing the connection. For example, the wireless access module 108 may allow the user to interact with the aircraft equipment 102 utilizing the mobile device 106 as a user interface via the established connection.

In one embodiment, the wireless access module 108 may allow the mobile device 106 to establish a control interface with the aircraft equipment 102. The wireless access module 108 may allow the user to utilize the securely connected mobile device 106 to enter text, move a cursor, manipulate a display, manage communications, receive information, and/or carry out any other function that could be otherwise accomplished via the onboard user interface 104 of the aircraft equipment 102. For example, the wireless access module 108 may allow a pilot to control a cursor and/or enter text in an avionics display utilizing a tablet having a secured wireless connection with the avionics display. In another example, the wireless access module 108 may allow a crew member to exchange messages with ground crew utilizing a smartphone, wherein an onboard CMU receives the messages from the smartphone utilizing an established secured wireless connection and transmits the messages from the aircraft to ground crew. The foregoing examples are included for illustrative purposes only and should not be construed to limit the present disclosure in any way.

The wireless access module 108 may include hardware, software, and/or firmware configured to establish a secured connection between the aircraft equipment 102 and the mobile device 106. For example, the wireless access module 108 may include one or more computing systems including one or more processors configured to execute program instructions from carrier media, such as a hard disk, flash memory, RAM, solid-state disk, magnetic tape, or any other information bearing media known to the art. The wireless access module 108 may further include one or more wireless communication devices, such as receivers, transmitters, and/or transceivers, configured for one or more wireless protocols known to the art, such as Bluetooth, infrared, NFC, cellular, WiFi, optical communication, and the like.

In one embodiment, the wireless access module 108 may be configured to require at least one user to complete one or more steps to establish the secured wireless connection with the mobile device 106. The wireless access module 108 may be further configured to require the user to complete one or more steps within desired proximity of the aircraft equipment 102 or the user interface 104 of the aircraft equipment 102. Requiring user intervention within desired proximity may increase security by preventing distantly located persons from gaining unauthorized access to aircraft equipment 102 by establishing an unauthorized wireless connection. Advantageously, access may only be granted to specific users by presenting a random machine-generated security passcode to only the specific user for which access may be granted while others may not be able to perceive the random machine-generated security passcode.

The wireless access module 108 may be configured to initiate mobile device pairing after receiving a first connection request from the user interface 104 of the aircraft equipment 102 and a second connection request from the mobile device 106. It is noted herein that the first and second connection requests may occur in any order and are labeled "first" and "second" for identification purposes only. The user interface 104 may be configured to generate the first connection request in response to a user interaction with the user interface 104, such as pressing a button/keypad, engaging a touchpad/touchscreen, issuing a voice command, swiping a magnetized card, presenting an RFID tag, scanning a barcode. For example, FIG. 1B illustrates a user interface 104A configured to initiate a connection request when the user selects a "START" button.

In one embodiment, the wireless access module 108 may be further configured to require a valid user login before accepting the first connection request from the user interface 104 of the aircraft equipment 102. The wireless access module 108 may be configured to receive a user login from the user interface 104. The wireless access module 108 may be further configured to compare the user login to one or more valid user logins stored in memory accessible by the wireless access module 108. The wireless access module 108 may be further configured to receive the first connection request when the user login received from the user interface 104 matches a valid user login from the one or more valid user logins stored in memory. The wireless access module 108 may be configured to require a user login for all connections.

Alternatively, the wireless access module 108 may be configured to require a user login only for accessing specified equipment and/or information. As illustrated in FIG. 1B, the user interface 104B may be configured to accept a user login, such as a user ID and/or password, bar code, RFID tag, magnetized card, fingerprint scan, image recognition, and/or any other user identification technique known to the art.

In one embodiment, the wireless access module 108 may be further configured to restrict access to certain information and/or equipment based on a user identity associated with a request to establish a secured wireless connection. User identity may include a particular person by name or may refer to a particular person by position associated with a level of access. For example, users or classes of users may have access levels (e.g. pilot, crew member, passenger, etc.) associated with their user identities. The user identity may be associated with the user login utilized to establish a connection and/or the aircraft equipment 102 for which a connection is desired. For example, a pilot logging in may have full access to all information and/or equipment based on the pilot's user identity associated with the pilot's user login. Alternatively, the pilot may gain full access by establishing a connection with aircraft equipment 102 that only a pilot would have access to, such as flight deck avionics or other pilot equipment.

The wireless access module 108 may be further configured to generate a random machine-generated security passcode associated with the first and second connection requests. The wireless access module 108 may be configured to generate a random machine-generated security passcode each time a mobile device 106 is paired with aircraft equipment 102. Alternatively, the wireless access module 108 may be configured to generate a random machine-generated security passcode for pairing a group of mobile devices 106 with aircraft equipment 102. For example, the wireless access module 108 may generate a random machine-generated security passcode to pair a group of mobile devices 106 (e.g. passenger mobile devices) with commonly accessible aircraft equipment 102 (e.g. bulkhead display).

The wireless access module 108 may be further configured to present the random machine-generated security passcode to one or more specific users while preventing access to the random machine-generated security passcode to others. Optionally, at least one user receiving the random machine-generated security passcode may differ from the user that initiated the first connection request. At least one user controlling the mobile device 106 may further receive a prompt, such as an explicit or implicit direction, to enter a user-entered security passcode into the mobile device 106 to continue pairing the mobile device 106 with the aircraft equipment 102. As illustrated in FIG. 1C, the wireless access module 108 may be configured to present the random machine-generated security passcode to the user utilizing the user interface 104 of the aircraft equipment 102, an information delivery module, or any other audio/visual device. Accordingly, the mobile device 106 may be configured to accept a user-entered security passcode.

The wireless access module 108 may be further configured to accept the user-entered security passcode from the mobile device 106. The wireless access module 108 may be further configured to compare the user-entered security passcode with the random machine-generated security passcode. The wireless access module 108 may be further configured to establish a secured wireless connection between the aircraft equipment 102 and the paired mobile device 106 when the user-entered security passcode matches the random machine-generated security passcode. The wireless access module 108 may be further configured to allow the mobile device 106 to access aircraft information from the aircraft equipment 102 utilizing the secured wireless connection.

The wireless access module 108 may be configured to maintain the secured wireless connection between the aircraft equipment 102 and the paired mobile device 106 until the connection is terminated by shutting down the aircraft equipment 102 or mobile device 106, removing the mobile device 106 beyond range of the wireless access module 108, disconnecting via hardware/software command, or any other voluntary or involuntary action to disrupt communication between the mobile device 106 and the aircraft equipment 102. Alternatively, the wireless access module 108 may be configured to automatically disconnect the mobile device 106 when a specified event occurs, such as expiration of a specified time period, attempted access to unauthorized information, pairing a new mobile device, and/or any other specified event or combination of specified events.

In one embodiment, the wireless access module 108 may be further configured to require a security confirmation to reestablish a connection or to access additional information. The wireless access module 108 may be configured to generate an additional random machine-generated security passcode when the wireless access module 108 receives a request from the mobile device 106 to access certain additional information that may require heightened security. The wireless access module 108 may be configured to present the additional random machine-generated security passcode to the the user controlling the paired mobile device 106 to enter the additional user-entered security passcode into the mobile device 106. The wireless access module 108 may be further configured to receive the user-entered security passcode from the mobile device 106 to compare the user-entered security passcode to the additional random machine-generated security passcode. The wireless access module 108 may be further configured to establish access to the additional information when the user-entered security passcode matches the additional random machine-generated security passcode.

The system 100 may further include an alert system configured to provide an audible and/or visual warning when unauthorized access to restricted information is attempted. The warning may further include user information, such as the location and/or identity of the user attempting unauthorized access to restricted aircraft information. The alert system may be configured to detect unauthorized access based on attempted access location, aircraft equipment 102 being accessed, invalid login, or unauthorized user identity. The alert system may be configured to alert one or more specified persons, such as the pilot, crew members, ground crew, and/or security authorities. The alert system may be further configured to disable the aircraft equipment 102 being accessed. In a further embodiment, the alert system may be further configured to disable one or more classes of aircraft equipment 102 or user access levels. For example, all passenger equipment and/or passenger access may be disabled in response to a passenger attempting unauthorized access to restricted information (e.g. pilot or crew member information).

FIG. 2 is a flow diagram illustrating a related method 200 of establishing a secured wireless connection between aircraft equipment 102 and a mobile device 106 that may be embodied by the system 100 or any other devices or systems known to the art for carrying out steps of method 200. In step 202, aircraft information may be received utilizing aircraft equipment 102, such as one or more sensors or information delivery modules. In step 204, a first connection request may be generated by interacting with the user interface 104 of the aircraft equipment 102. In one embodiment, the interaction may include a user login. A user identity associated with the user login may correspond to a user access level. Alternatively, the user identity may be associated with the aircraft equipment 102 for which a connection is desired. In step 206, the mobile device 106 being paired with the aircraft equipment may generate a second connection request. In step 208, a random security passcode may be generated in response to the first and/or second connection requests. In step 210, the random machine-generated security passcode may be presented only to a specific user controlling the mobile device 106 with an explicit or implicit prompt to enter the user-entered security passcode into the mobile device 106. In steps 214 and 216, the user-entered passcode may be compared against the random machine-generated security passcode. In step 218, a secured wireless connection between the mobile device 106 and the aircraft equipment 102 may be established if the user-entered security passcode matches the random machine-generated security passcode. In step 220, the mobile device 106 may access aircraft information from the aircraft equipment 102 wirelessly utilizing the established connection.

In one embodiment, the method 200 may further include restricting access to certain aircraft information based upon the user access level associated with the user identity. The user identity may correspond to a user login, aircraft equipment 102 being connected to, and/or the mobile device 106 being paired.

In one embodiment, the method 200 may further include requiring a security confirmation to access certain additional aircraft information. An additional random machine-generated security passcode may be generated when a request for certain additional information is received. The additional machine-generated security passcode may be presented to the user controlling the mobile device 106 utilizing an onboard user interface 104, information delivery module, and/or any other onboard audio/visual device. The user may be further prompted to enter an additional user-entered security passcode into the mobile device 106. The mobile device 106 may gain access to the additional information when the additional user-entered security passcode matches the additional random machine-generated security passcode.

Advantageously, the random machine-generated security passcode may be presented in proximity to the specific users designated to obtain a connection while preventing others from accessing the random machine-generated security passcode. For example, when a pilot desires access or a wireless connection, the random machine-generated security passcode may be displayed on a cockpit display and only the pilots may be able to view the random machine-generated security passcode. Therefore, passengers and crew members would not be able to view the random machine-generated security passcode and thus would be prevented access to information reserved for access only by pilots. With respect to passengers and crew members, the random machine-generated security passcode may only be presented to designated recipients or specific users where other users may be prevented from accessing the random machine-generated security passcode.

It is contemplated that the random machine-generated security passcode may only be presented to specific users via displaying the random machine-generated security passcode on a display visible only to the specific user. Additionally, the random machine-generated security passcode may only be presented to a specific user by presenting an audio version directly to the specific user. It is contemplated that other mechanisms may be employed to present the random machine-generated security passcode only to a specific user may be employed without departing from the scope and intent of the present disclosure.

While it is contemplated that the random machine-generated security passcode may be presented as a personal identification number or a password while includes a plurality of alpha-numeric digits, it is also contemplated that other types of information may be presented. For example, the random machine-generated security passcode may be a barcode, QR code and the like. In such an implementation, the user is requested to scan the code with the mobile device whereby a comparison may be executed to determine if the scanned image matches the random machine-generated security passcode presented as a barcode, QR code or other machine-readable code. It is contemplated that other types of random machine-generated security passcodes may also be employed without departing from the scope and intent of the present disclosure.

It should be recognized that the various steps described throughout the present disclosure may be carried out by a single computing system or, alternatively, a multiple computing system. Moreover, different subsystems of the system may include a computing system suitable for carrying out at least a portion of the steps described above. Therefore, the above description should not be interpreted as a limitation on the present invention but merely an illustration. Further, the one or more computing systems may be configured to perform any other step(s) of any of the method embodiments described herein.

The computing system may include, but is not limited to, a personal computing system, mainframe computing system, workstation, image computer, parallel processor, or any other device known in the art. In general, the term "computing system" may be broadly defined to encompass any device having one or more processors, which execute instructions from a memory medium.

Program instructions implementing methods such as those described herein may be transmitted over or stored on carrier medium. The carrier medium may be a transmission medium such as a wire, cable, or wireless transmission link. The carrier medium may also include a storage medium such as a read-only memory, a random access memory, a magnetic or optical disk, or a magnetic tape.

All of the methods described herein may include storing results of one or more steps of the method embodiments in a storage medium. The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc. Furthermore, the results may be stored "permanently," "semi-permanently," temporarily, or for some period of time. For example, the storage medium may be random access memory (RAM), and the results may not necessarily persist indefinitely in the storage medium.

It is further contemplated that each of the embodiments of the method described above may include any other step(s) of any other method(s) described herein. In addition, each of the embodiments of the method described above may be performed by any of the systems described herein.

Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected", or "coupled", to each other to achieve the desired functionality, and any two components capable of being so associated can also be viewed as being "couplable", to each other to achieve the desired functionality. Specific examples of couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

Furthermore, it is to be understood that the invention is defined by the appended claims.

Although particular embodiments of this invention have been illustrated, it is apparent that various modifications and embodiments of the invention may be made by those skilled in the art without departing from the scope and spirit of the foregoing disclosure. Accordingly, the scope of the invention should be limited only by the claims appended hereto.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A system for providing secured wireless access to aircraft information, comprising:
    aircraft equipment configured to at least one of send information or receive information; and
    a wireless access module in communication with the aircraft equipment, the wireless access module including a memory and configured to:
        receive a first connection request from a user interface of the aircraft equipment;
        receive a second connection request from a mobile device;
        generate a random machine-generated security passcode associated with the first and second connection requests;
        present the random machine-generated security passcode to a user, wherein the user is prompted to enter a user-entered security passcode into the mobile device;
        receive a user-entered security passcode from the mobile device;
        compare the user-entered security passcode and the random machine-generated security passcode;
        establish a wireless connection between the aircraft equipment and the mobile device when the user-entered security passcode matches the random machine-generated security passcode;
        allow the mobile device to access aircraft information through the aircraft equipment via the established wireless connection;
        receive a user identity; and
        restrict access to certain aircraft information based upon the user identity, wherein a first access level is associated with a pilot user identity, wherein a second access level is associated with a crew member user identity, wherein a third access level is associated with a passenger user identity.

2. The system of claim 1, wherein the aircraft equipment includes at least one of a flight management system, flight entertainment system, flight deck avionics, communication management unit, a flight deck display, a navigation display, a crew display, a galley display, a bulkhead display, a passenger seat back display, or a passenger personal display.

3. The system of claim 1, wherein the aircraft information includes at least one of position, speed, trajectory, elapsed time, time to destination, anticipated delay, flight plan, weather radar data, traffic data, sensor data, aircraft performance data, equipment controls, external air temperature, attendant call button activity, cabin status messages, ground crew communications, inflight entertainment, or connecting flight information.

4. The system of claim 1, wherein the wireless access module is configured to establish the wireless connection utilizing at least one of Wi-Fi, Bluetooth, NFC, cellular or infrared communication.

5. The system of claim 1, wherein the user identity is associated with a user login.

6. The system of claim 1, wherein the user identity is associated with the aircraft equipment being accessed.

7. The system of claim 1, wherein the wireless access module is further configured to:
receive a user login;
compare the user login with one or more valid logins; and
receive the first connection request from the user interface of the aircraft equipment when the user login matches a valid login.

8. The system of claim 1, wherein the wireless access module is further configured to:
disconnect the mobile device after a predetermined time.

9. The system of claim 1, wherein the wireless access module is further configured to:
receive a request to access additional information;
generate an additional random machine-generated security passcode associated with the request to access additional information;
present the additional random machine-generated security passcode to the user, wherein the user is prompted to enter an additional user-entered security passcode into the mobile device;
receive the additional user-entered security passcode from the mobile device;
compare the additional user-entered security passcode and the additional random machine-generated security passcode; and
establish access to the additional information when the additional user-entered security passcode matches the additional random machine-generated security passcode.

10. A system for providing secured wireless access to vehicle information, comprising:
vehicle equipment configured to at least one of send or receive information; and
a wireless access module in communication with the vehicle equipment, the wireless access module including a memory and configured to:
receive a first connection request from a user interface of the vehicle equipment;
receive a second connection request from a mobile device;
generate a random machine-generated security passcode associated with the first and second connection requests;
present the random machine-generated security passcode to a user, wherein the user is prompted to enter a user-entered security passcode into the mobile device;
receive the user-entered security passcode from the mobile device;
compare the user-entered security passcode and the random machine-generated security passcode;
establish a wireless connection between the vehicle equipment and the mobile device when the user-entered security passcode matches the random machine-generated machine security passcode;
allow the mobile device to access vehicle information through the vehicle equipment via the established wireless connection;
receive a user identity; and
restrict access to certain vehicle information based upon the user identity, wherein a first access level is associated with a pilot user identity, wherein a second access level is associated with a crew member user identity, wherein a third access level is associated with a passenger user identity.

11. The system of claim 10, wherein the user identity is associated with at least one of a user login or the vehicle equipment being accessed.

12. The system of claim 10, wherein the wireless access module is further configured to:
receive a user login;
compare the user login with one or more valid logins; and
receive the first connection request from the user interface of the vehicle equipment when the user login matches a valid login.

13. The system of claim 10, wherein the wireless access module is further configured to:
disconnect the mobile device after a predetermined time.

14. The system of claim 10, wherein the wireless access module is further configured to:
receive a request to access additional information;
generate an additional random machine-generated security passcode associated with the request to access additional information;
present the additional random machine-generated security passcode to the user, wherein the user is prompted to enter an additional user-entered security passcode into the mobile device;
receive the additional user-entered security passcode from the mobile device;
compare the additional user-entered security passcode and the additional random machine-generated security passcode; and
establish access to the additional information when the additional user-entered security passcode matches the additional machine-generated security passcode.

15. A computer-implemented method of providing secured wireless access to aircraft information, comprising the steps of:
receiving aircraft information utilizing aircraft equipment;
receiving a first connection request from a user interface of the aircraft equipment;
receiving a second connection request from a mobile device;
generating a random machine-generated security passcode associated with the first and second connection requests;
presenting the random machine-generated security passcode to a user;
prompting the user to enter a user-entered security passcode into the mobile device;
receiving a user-entered security passcode from the mobile device;
comparing the user-entered security passcode and the random machine-generated security passcode;
establishing a wireless connection between aircraft equipment and the mobile device when the user-entered security passcode matches the random machine-generated security passcode;
allowing the mobile device to access aircraft information through the aircraft equipment via the established wireless connection;
receiving a user identity; and restricting access to certain aircraft information based upon the user identity, wherein a first access level is associated with a pilot user identity, wherein a second access level is associated with a crew member user identity, wherein a third access level is associated with a passenger user identity.

16. The computer-implemented method of claim 15, further comprising the steps of:
receiving a user login;
comparing the user login with one or more valid logins; and
receiving the first connection request from the user interface of the aircraft equipment when the user login matches a valid login.

17. The computer-implemented method of claim 15, further comprising the steps of:
receiving a request to access additional information;
generating an additional random machine-generated security passcode associated with the request to access additional information;
presenting the additional random machine-generated security passcode to the user;
prompting the user to enter an additional user-entered security passcode into the mobile device;
receiving an additional user-entered security passcode from the mobile device;
comparing the additional user-entered security passcode and the additional random machine-generated security passcode; and
establishing access to the additional information when the additional user-entered security passcode matches the additional random machine-generated security passcode.

* * * * *